United States Patent [19]

Eastep

[11] Patent Number: 5,740,434
[45] Date of Patent: Apr. 14, 1998

[54] SYSTEM FOR MAINTENANCE OF DATABASE INTEGRITY

[75] Inventor: Thomas M. Eastep, Lynnwood, Wash.

[73] Assignee: Tandem Computers Incorporated, Cupertino, Calif.

[21] Appl. No.: 716,653

[22] Filed: Sep. 5, 1996

Related U.S. Application Data

[63] Continuation of Ser. No. 377,388, Jan. 23, 1995, abandoned.

[51] Int. Cl.$^6$ .................................................. G06F 17/30
[52] U.S. Cl. .................. 395/618; 395/617; 395/618; 395/182.14; 395/183.13; 395/250; 395/479
[58] Field of Search .................................... 395/600, 617, 395/618, 619, 182.14, 183.13, 250, 479

[56] References Cited

U.S. PATENT DOCUMENTS

| | | | |
|---|---|---|---|
| 4,878,167 | 10/1989 | Kapulka et al. | 364/200 |
| 5,043,866 | 8/1991 | Myer, Jr. et al. | 364/200 |
| 5,247,672 | 9/1993 | Mohan | 395/650 |
| 5,379,412 | 1/1995 | Eastridge et al. | 395/575 |
| 5,414,839 | 5/1995 | Joshi | 395/600 |
| 5,452,430 | 9/1995 | Dievendorff et al. | 395/183.13 |
| 5,455,944 | 10/1995 | Haderle et al. | 395/600 |
| 5,455,946 | 10/1995 | Mohan et al. | 395/600 |
| 5,459,862 | 10/1995 | Garliepp et al. | 395/600 |
| 5,495,601 | 2/1996 | Narang et al. | 395/600 |

*Primary Examiner*—Thomas G. Black
*Assistant Examiner*—Cheryl R. Lewis
*Attorney, Agent, or Firm*—Townsend and Townsend and Krueger LLP

[57] ABSTRACT

A method and system for maintaining database integrity utilizes a LOG file organized into slots with the number of slots never exceeding the largest number of concurrent transactions updating the database.

4 Claims, 5 Drawing Sheets

SYSTEM FOR MAINTENANCE OF DATABASE INTEGRITY

This is a continuation of Ser. No. 08/377,388 filed Jan. 23, 1995, now abandoned.

BACKGROUND OF THE INVENTION

The present invention relates generally to maintaining database integrity in the event of a system failure and more particularly relates to process for creating a system log to facilitate recovery processes.

There are many methods utilized to maintain database integrity in the event of a system failure. Fundamental to many methods is a programmatic construct called a transaction which can be an explicitly delimited operation or set of operations that changes the content of a database from one consistent state to another.

The database operations within a transaction are treated as single unit. Either all changes made by the transaction to the database are made permanent (the transaction is committed) on none of the changes to the database are made permanent (the transaction is aborted). If a failure occurs during the execution of a transaction, whatever partial changes were made to the database are undone automatically, thus leaving the database in a consistent state.

If the transaction affects files or database records in a database, then, before the transaction permanently commits its changes to the database, information about the database records affected by the transaction is written to an audit trail file.

To facilitate a complete recovery of a database in the event of a catastrophic failure a complete journal of all transactions is maintained. Complex disc management protocols such as handling overflows by wrap-around and archiving must be utilized.

SUMMARY OF THE INVENTION

A present invention is a system and process for the maintenance of database integrity in the presence of multiple failures that utilizes a LOG file organized into slots to store LOG records, identified by increasing log sequence numbers, corresponding to transactions performed on the database.

According to one aspect of the invention, prior to writing the details of a transaction to a slot all database records involved in the transaction are locked to assure independence of concurrent transactions. The database records involved in a transaction are unlocked when the transaction is complete. Slots are available when the corresponding transaction is complete and unavailable if the transaction is currently in progress and are reused in the order that they become available. Thus, the number of slots never exceeds the largest number of concurrent transactions updating the database and complex disc management processes such as wrap around and archiving are not required.

According to another aspect of the invention, during recovery LOG records are dropped from further consideration if there is a later LOG record that involves one of the same database records. The remaining LOG records are processed in LOG sequence number order. For each LOG record, if the corresponding transaction was only partially complete then it is backed out.

Other features and advantages of the invention will be apparent in view of the following detailed description and appended drawings.

DESCRIPTION OF THE PREFERRED EMBODIMENT

A preferred embodiment of the invention is a fault tolerant Name Server process, operating in a UNIX environment, that recovers from failures to maintain database integrity. The Name Server controls the UNIX filename hierarchy, mapping UNIX filenames down to disc addresses. A database is maintained with records, called inodes in UNIX parlance, with other records pointing to files and directory names. The result of a lookup are the disc address of the file and the file information (size, dates, etc.).

In particular, Data Description Language (DDL) transactions may involve several database records. Thus, if a failure occurs during a DDL transaction, the recovery process must resolve the database to a consistent state by either backing out updates already implemented or completing partial updates.

Figure 1:
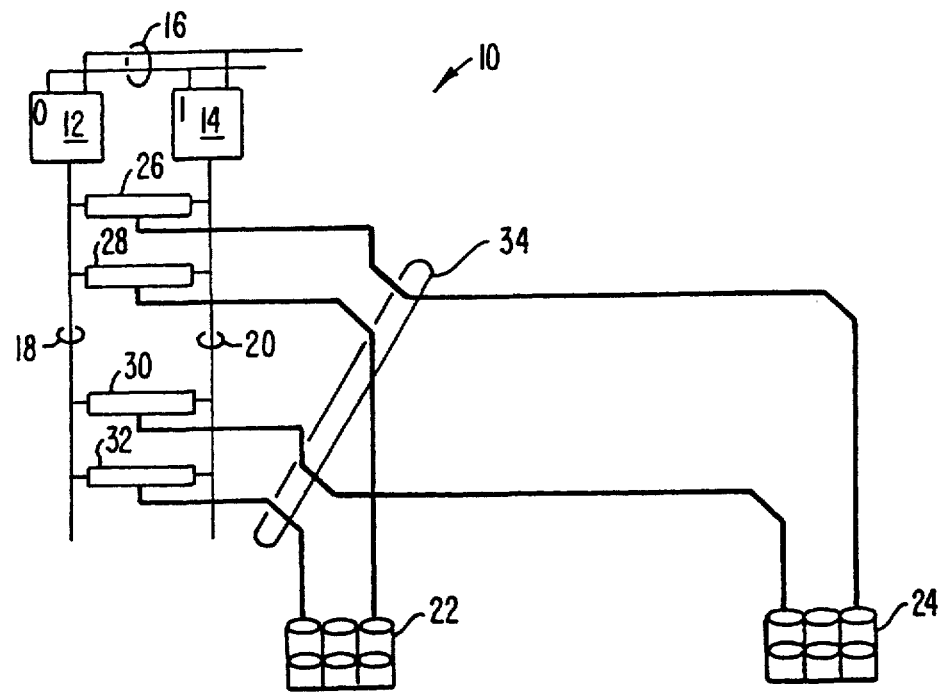
Figure 2:
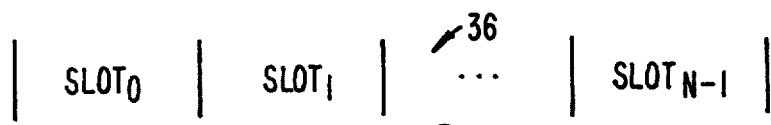
Figure 3:
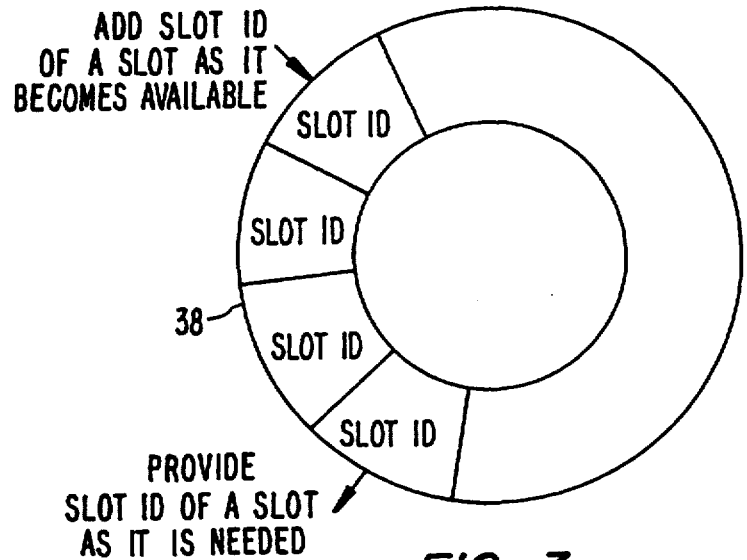
Figure 4:
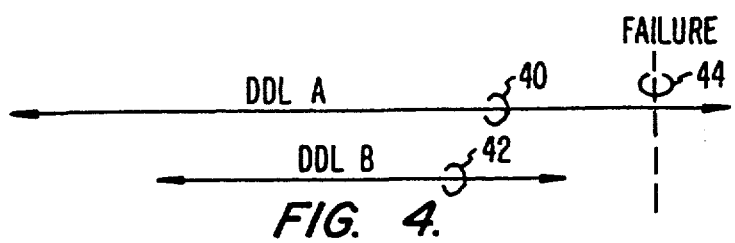
Figure 5:
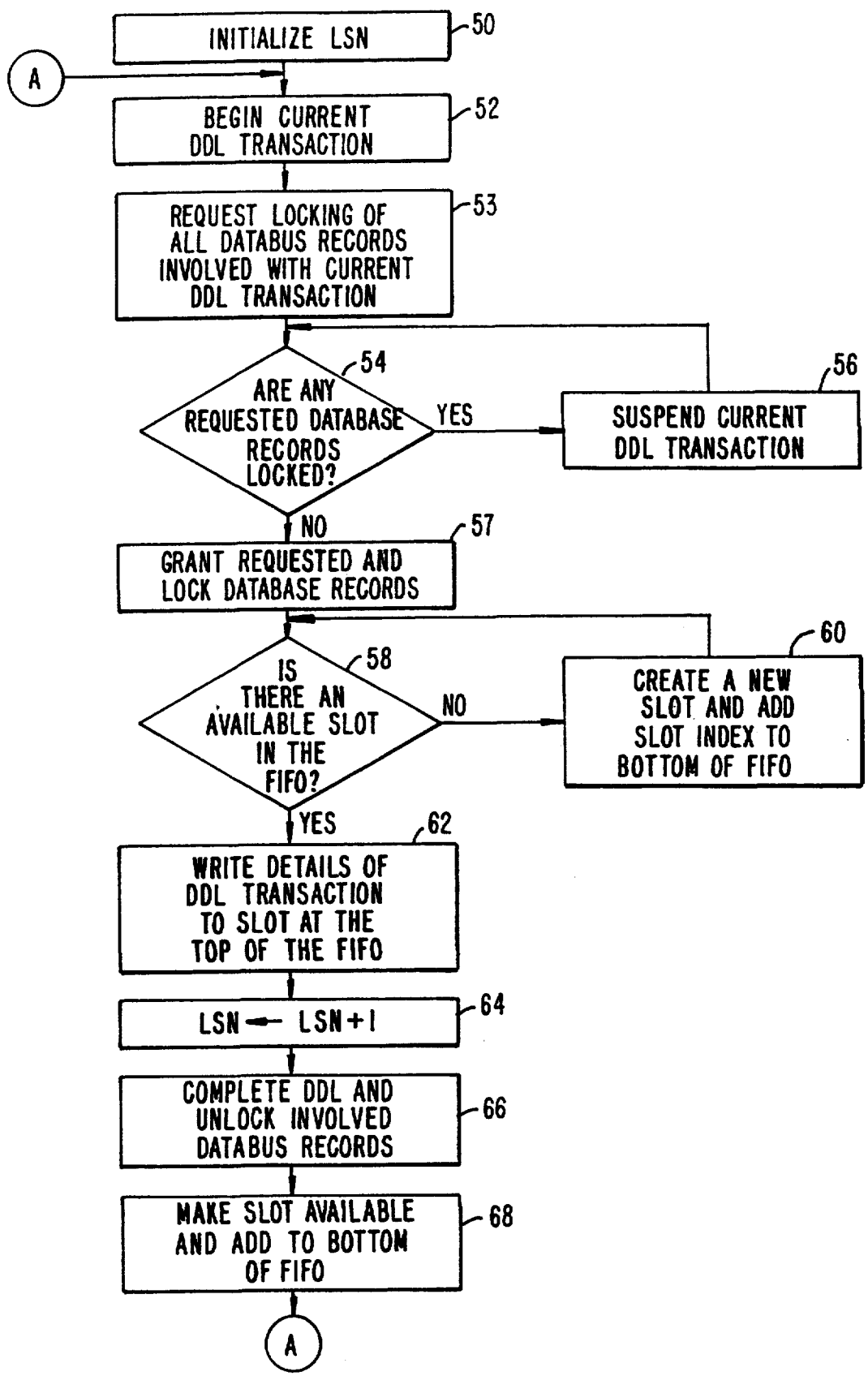
Figure 6:
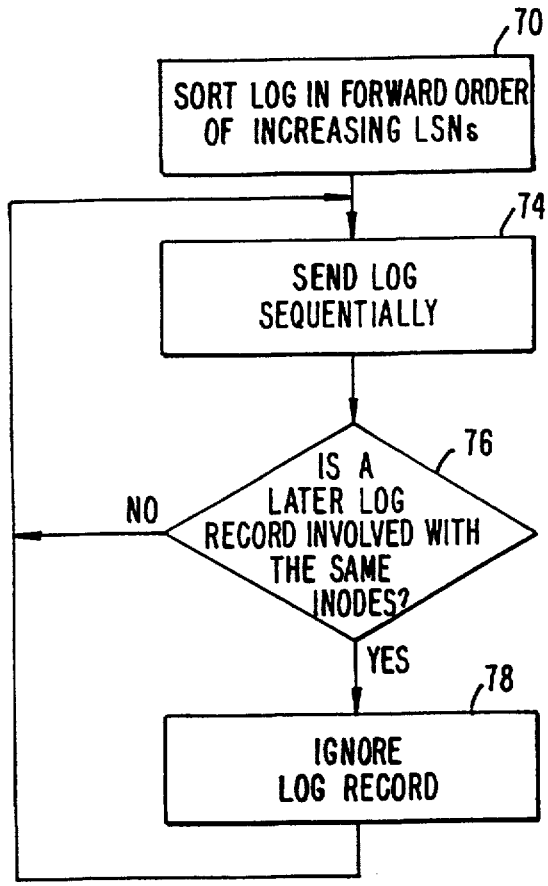
Figure 7:
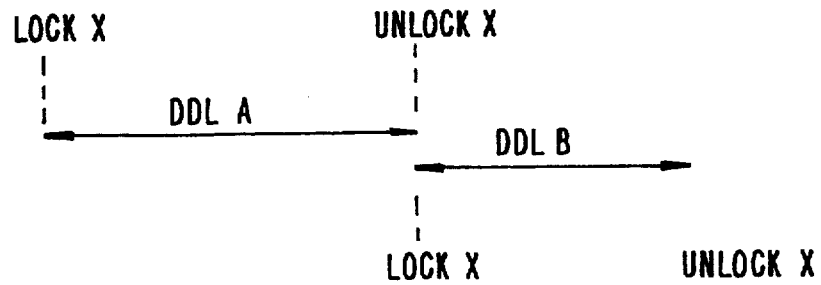

FIG. 1 is a block diagram of data processing system in which the recovery process can be implemented. The system 10 includes first and second CPUs 12 and 14 coupled by an Interprocessor BUS (IPB) 16. First and second data busses 18 and 20 are coupled to the I/O ports of the CPUs 12 and 14 and to disc storage units 22 and 24 via disc controllers 26–32 and cables 34.

Figure 1A:
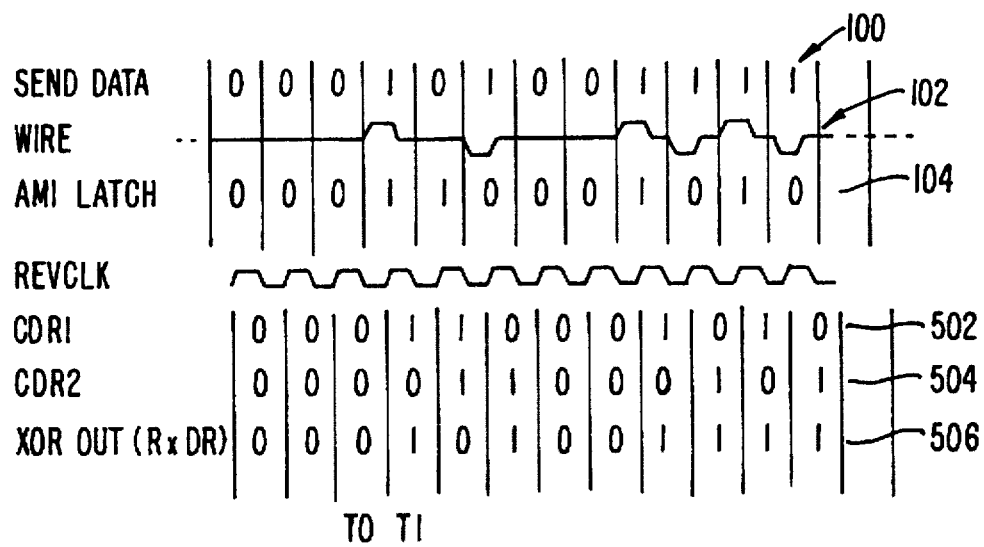
FIG. 1 is a block diagram of a data processing system.
Figure 1B:
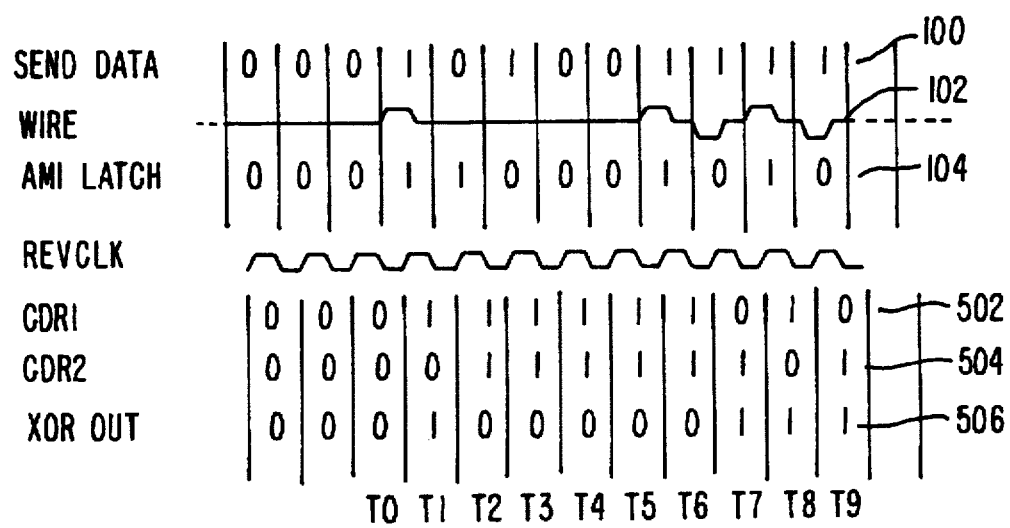
Figure 2:
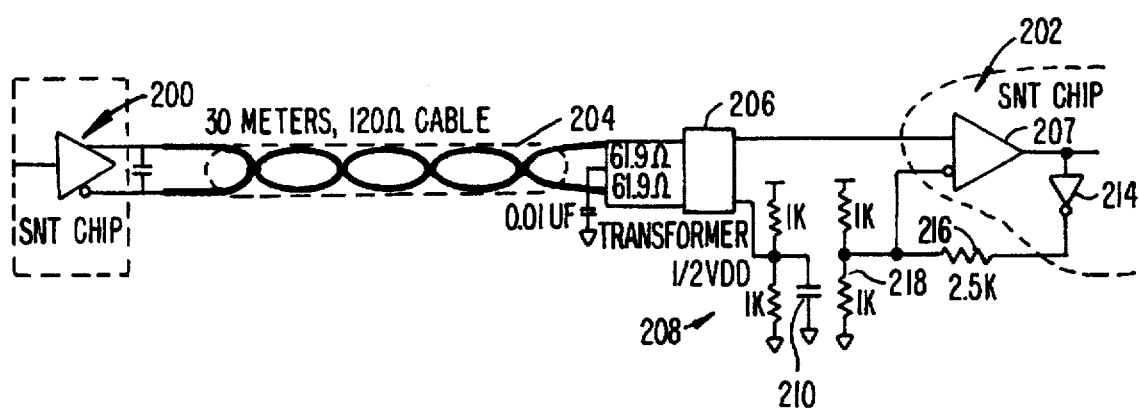
FIG. 2 is a schematic diagram of a LOG file.

As depicted in FIG. 2, the LOG file 36 used in the present recovery process is an unstructured file organized into 2048-byte slots. Each slot is referred to by a slot index identifying the relative position of the slot in the file, e.g., the slot index for the first slot is 0, for second slot is 1, etc.

At any given time, a slot in the LOG file is either occupied or available. If a particular slot is occupied then there is a DDL transaction in progress, the details of which are recorded in the particular slot. If a particular slot is available, then the last transaction to use the slot has been completed. When the name server needs to use a LOG slot, it first determines if a slot is available; if not, a new slot is added to the end of the LOG.

The occupied or available status of each slot is kept in name server memory. Accordingly, when a slot if freed there is no need to record the availability of the slot on disk.

Figure 3:
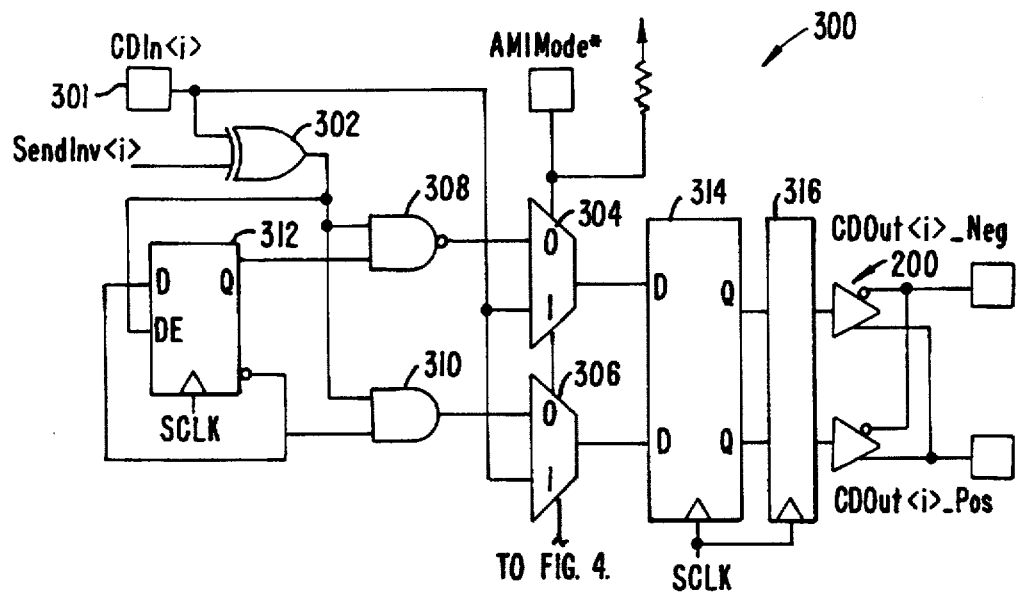
FIG. 3 is a symbolic diagram of a FIFO.

As depicted symbolically in FIG. 3, as a slot becomes available its slot index is added to the bottom of a FIFO stack 38. In FIG. 3, when a slot becomes available its slot index is added to the bottom of the stack and when a slot is needed to record the details of a DDL transaction a slot index of a slot to be used is provided from the top of the stack.

Figure 4:
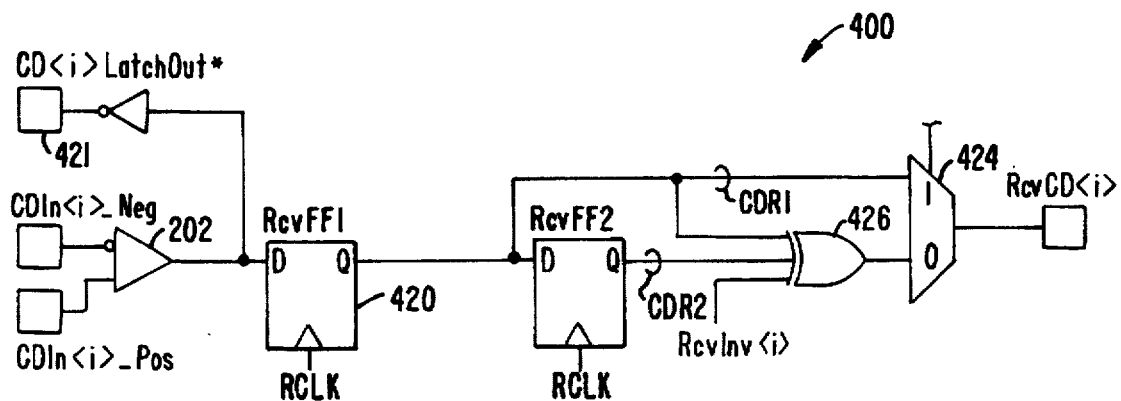
FIG. 4 is a schematic diagram of two transactions.

There are several key requirement for recovery utilizing the LOG file. The first requirement is that it must be possible to unambiguously determine whether, prior to the name server failure, a given DDL transaction began and if it completed. The second requirement is that concurrent DDL transactions must be independent in the sense that the concurrent transactions do not involve the same database records. For example, as depicted in FIG. 4, suppose that DDL transaction A 40 is a long transaction involving inode X and the DDL transaction B 42 is a short transaction involving the same inode. Further, suppose that A starts before B and the B finishes before A. If a failure 44 occurs between the time that B completes and the time the A completes, then backing out transaction A will likely restore X to its state prior to the start of B even though B is complete prior to the failure.

Figure 5:
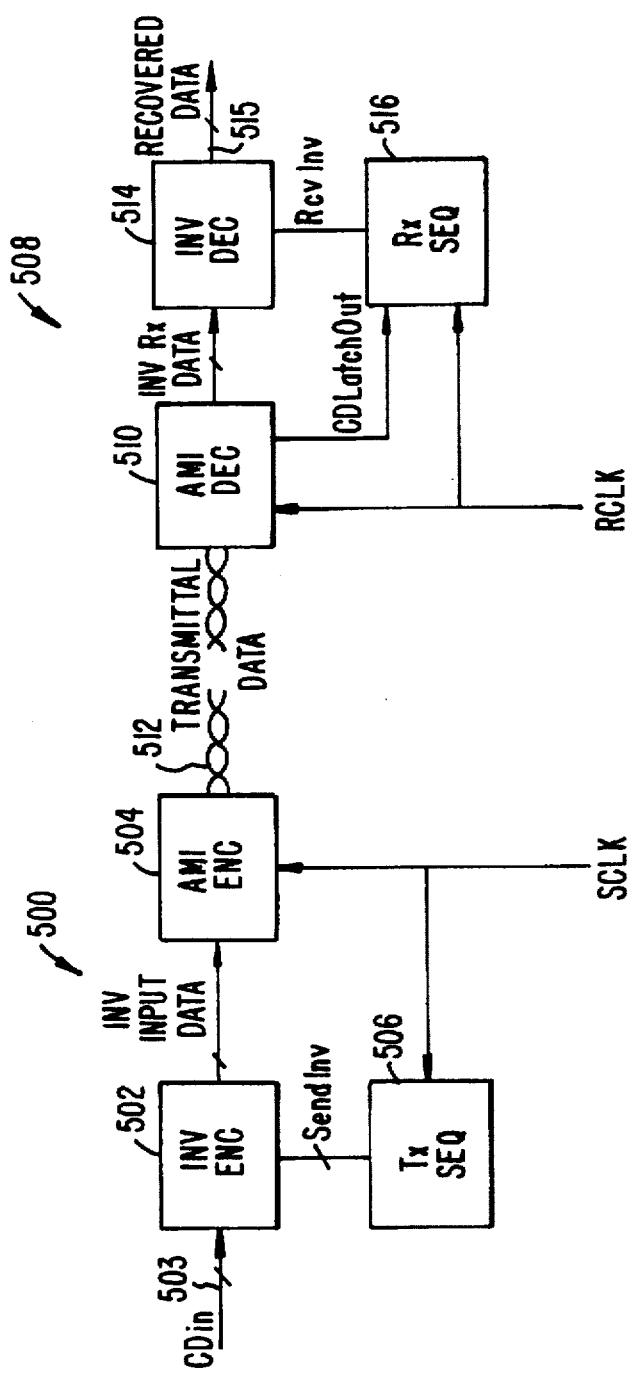
FIG. 5 is a flow chart of a process for creating a LOG file.

The process for writing LOG records to slots in the LOG file will now be described with reference to the flow chart depicted in FIG. 5. Each LOG record written to the LOG 38 has a Log Sequence Number (LSN) where the LSNs are initialized 50 to zero and increase monotonically as LOG records are written to the LOG 38.

A current DDL transaction is commenced 52 and the DDL operation requests 53 a lock of the database records involved in the current transaction. It is then tested 54 whether any of the involved database records are currently locked. If any of the database records are currently locked by another active DDL transaction then the current transaction is suspended 56 until the lock is released by the other transaction. If none of the involved database records are locked then the request is granted 57. Thus, the second requirement that the concurrent DDL transactions be independent is satisfied.

Once the inodes involved in the transaction are locked it is tested 58 whether an available slot is in the FIFO. If no slot is available then the name server adds 60 another slot to the LOG 36 and adds the slot index of the added slot to the bottom of the FIFO stack 38. Once there is an available slot in the FIFO stack 38 then the details of the DDL transaction are written 62 to a LOG record in the slot and LSN is incremented 64.

When the DDL transaction is completed the inodes involved in the DDL transaction are unlocked 66, the slot is made available, and the slot index of the slot is added 68 to the bottom of FIFO stack 38. The unlocking of the slot upon completion of the DDL transaction assures satisfaction of the second requirement.

Figure 6:
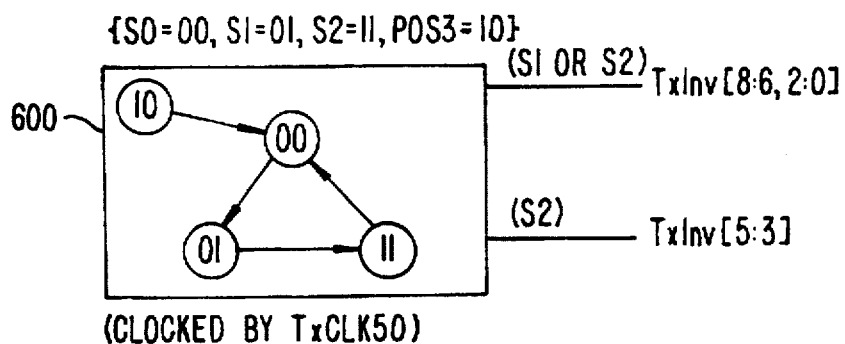
FIG. 6 is a flow chart of a recovery process.

The recovery process will now be described with reference to the flow chart depicted in FIG. 6. First, the LOG is sorted 70 in forward order of increasing LSNs. The LOG is the read sequentially 74; each LOG record is dropped from further consideration 78 if there is a later LOG record (one with a higher LSN) involved with one of the same inodes 76. Thus, irrelevant LOG records are not processed during recovery processing. The relevant LOG records are then scanned in forward order and partially completed DDL transactions are backed out.

Figure 7:
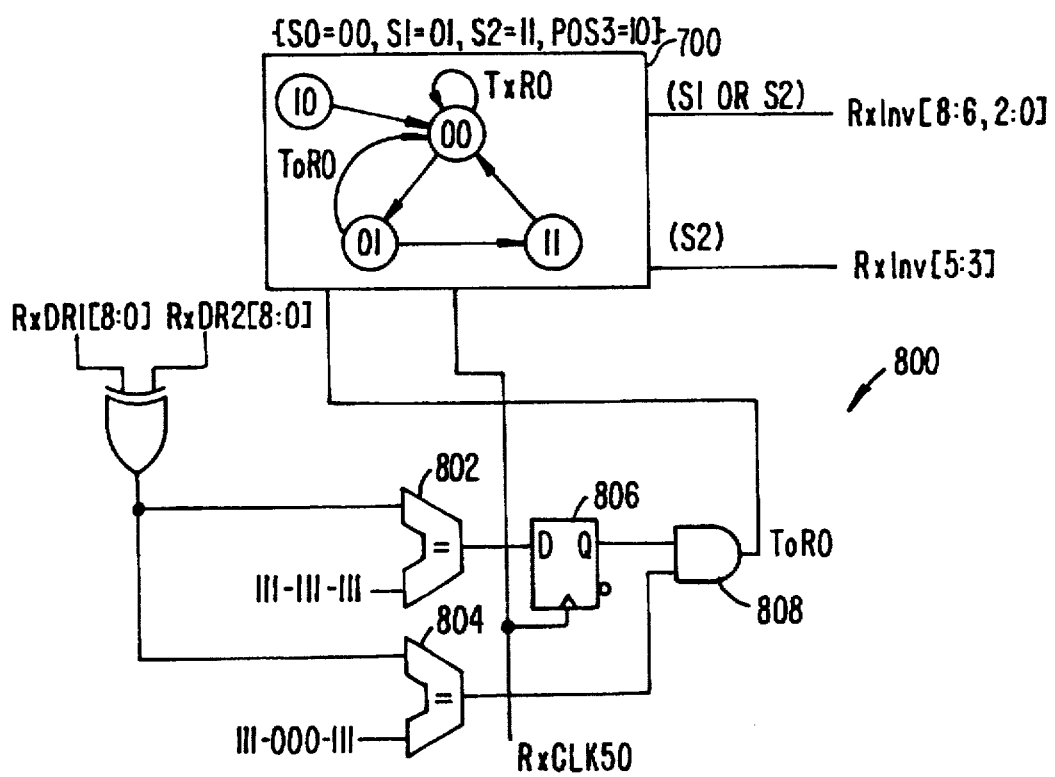
FIG. 7 is a symbolic diagram of two transactions.

The effect of the recovery process on the DDL transactions A and B depicted in FIG. 4 will now be described. Those transactions are not independent because the transactions are concurrently operating on the same inode X. In the procedure described with reference to FIG. 4, the inodes for DDL A are locked prior to writing the details of DDL A to the LOG with an LSN having a value of N. Thus, DDL B can not begin until inode X is unlocked at the completion of DDL A. When DDL B begins inode X is again locked prior to writing the details of DDL B to a LOG record having an LSN greater than N. These transactions are depicted in FIG. 7.

In this case, during a recovery process for a failure occurring during the transaction DDL B, the LOG record having an LSN equal to N will be ignored because there is a later LOG record, the LOG record for DDL B, involving inode X. Thus, the irrelevant LOG record for DDL A is ignored because that transaction had been completed and a backout of the partially completed DDL B is performed.

Additionally, the reuse of available slots on a FIFO basis assures that LOG records for all active DDL transactions are not overwritten and also assures that the number of slots in log file never exceeds the number of LOG records equal to the largest number of concurrent DDL transactions.

The invention has now been described with reference to the preferred embodiments. However, alternatives and substitutions will now be apparent to persons of ordinary skill in the art. In particular, although the preferred embodiment is describe in a UNIX name server environment, the process described applies equally well to other environments to preserve a single applications's database integrity in the face of multiple failures of the system on which the application is running once that application is restarted. The UNIX specific inodes would be replaced with other keys or pointers identifying database records involved in a transaction. Accordingly, it is not intended to limit the application except as provided by the appended claims.

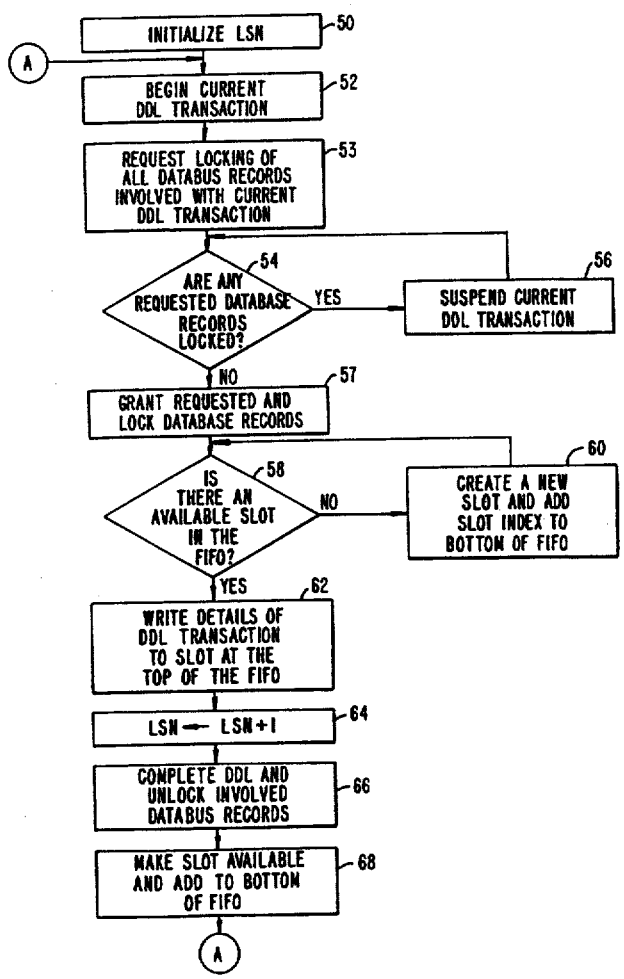

What is claimed is:

1. An improved process for preserving a database in the event of a failure occurring during a transaction involving database records, said process comprising the steps of:

creating a log file, including a plurality of slots each identified by a unique slot index, for storing a LOG record corresponding to an transaction-in-progress, with each LOG record identified by a unique monotonically increasing log sequence number (LSN) and with each slot storing details of single transaction and with the number of slots in said plurality being less than or equal to the number of transactions active at any given time;

identifying a slot as an unavailable slot if any database records involved with a corresponding transaction recorded in the slot have been locked;

identifying a slot as an available slot after all database records involved with a corresponding transaction recorded in the slot have been unlocked;

making slots available to store LOG records of subsequently active transactions in the order that slots are identified as being available so that the slots are made available and reused on a first-in-first-out basis thereby assuring that if there is a LOG record in the LOG file involving a given database record then the LOG file contains a LOG record corresponding to the last transaction involving the given database record;

beginning a given current transaction involving a set of database records and requesting locking of all database records in said set;

suspending said given current transaction if any database records in said set are currently locked;

if none of the database in said set are currently locked, locking all database records in said set prior to writing a LOG record for the given current transaction in the log file so that transactions concurrently active cannot operate on same database records thereby assuring independence of concurrent transactions;

writing details of said given current transaction in an existing slot in said log file made available on a first-in-first-out basis, or, if no existing slot is available, adding a new slot to the log file and making said new slot available on a first-in-first-out basis so that the details of said current active transaction are written to said new slot; and unlocking all database records in said set said given current transaction is completed.

2. The process of claim 1 further comprising the steps of:

during a recover from a failure, sorting the log file in forward order of increasing LSNs; and for a given LOG record corresponding to a transaction involving a particular database record, eliminating said given LOG record from consideration if, when scanning forward from the given LOG record, it is determined that a LOG record having a higher LSN corresponds to a transaction involving the particular database record.

3. A computer program product comprising:

a computer usable medium having a computer readable program code means embodied therein, said program code means for preserving a database in the event of a failure occurring during a transaction involving database records, the computer readable program code means in said computer program product comprising:

computer readable program code means for causing a computer to effect creating a log file, including a plurality of slots each identified by a unique slot index, for storing a LOG record corresponding to an transaction-in-progress, with each LOG record identified by a unique monotonically increasing log sequence number (LSN) and with each slot storing details of single transaction and with the number of slots in said plurality being no greater than the number of transactions active at any given time;

computer readable program code means for causing a computer to effect identifying a slot as an unavailable slot if any database records involved with a corresponding transaction recorded in the slot have been locked;

computer readable program code means for causing a computer to effect identifying a slot as an available slot after all database records involved with a corresponding transaction recorded in the slot have been unlocked;

computer readable program code means for causing a computer to effect making slots available to store LOG records of subsequently active transactions in the order that slots are identified as being available so that the slots are made available and reused on a first-in-first-out basis thereby assuring that if there is a LOG record in the LOG file involving a given database record then the LOG file contains a LOG record corresponding to the last transaction involving the given database record;

computer readable program code means for causing a computer to effect beginning a given current transaction involving a set of database records and requesting locking of all database records in said set;

computer readable program code means for causing a computer to effect suspending said given current transaction if any database records in said set are currently locked;

computer readable program code means for causing a computer to effect, if none of the database in said set are currently locked, locking all database records in said set prior to writing a LOG record for the given current transaction in the log file so that transactions concurrently active cannot operate on same database records thereby assuring independence of concurrent transactions;

computer readable program code means for causing a computer to effect writing details of said given current transaction in an existing slot in said log file made available on a first-in-first-out basis, or, if no existing slot is available, adding a new slot to the log file and making said new slot available on a first-in-first-out basis so that the details of said current active transaction are written to said new slot; and computer readable program code means for causing a computer to effect unlocking all database records in said set said given current transaction is completed.

4. The computer program product of claim 1 further comprising:

computer readable program code means for causing a computer to effect, during a recover from a failure, sorting the log file in forward order of increasing LSNs; and for a given LOG record corresponding to a transaction involving a particular database record, computer readable program code means for causing a computer to effect eliminating said given LOG record from consideration if, when scanning forward from the given LOG record, it is determined that a LOG record having a higher LSN corresponds to a transaction involving the particular database record.

* * * * *

UNITED STATES PATENT AND TRADEMARK OFFICE
CERTIFICATE OF CORRECTION

PATENT  : 5,740,434
DATED   : April 14, 1998
INVENTOR(S) : Thomas M. Eastep

It is certified that error appears in the above-identified patent and that said Letters Patent is hereby corrected as shown below:

The title page showing the illustrative figure should be deleted and substitute therefor the attached title page.

In the drawings, Figures 1 thru 5, should be deleted and substituted with the corrected Figures 1 thru 5, as shown on the attached pages.

Signed and Sealed this

Third Day of November, 1998

*Attest:*

*Attesting Officer*

BRUCE LEHMAN

*Commissioner of Patents and Trademarks*

United States Patent [19]

Eastep

[11] Patent Number: 5,740,434
[45] Date of Patent: Apr. 14, 1998

[54] SYSTEM FOR MAINTENANCE OF DATABASE INTEGRITY

[75] Inventor: Thomas M. Eastep, Lynnwood, Wash.

[73] Assignee: Tandem Computers Incorporated, Cupertino, Calif.

[21] Appl. No.: 716,653

[22] Filed: Sep. 5, 1996

Related U.S. Application Data

[63] Continuation of Ser. No. 377,388, Jan. 23, 1995, abandoned.
[51] Int. Cl.$^6$ ................................................. G06F 17/30
[52] U.S. Cl. .................... 395/618; 395/617; 395/618; 395/182.14; 395/183.13; 395/250; 395/479
[58] Field of Search ............................. 395/600, 617, 395/618, 619, 182.14, 183.13, 250, 479

[56] References Cited

U.S. PATENT DOCUMENTS

| | | |
|---|---|---|
| 4,878,167 | 10/1989 | Kapulka et al. ................. 364/200 |
| 5,043,866 | 8/1991 | Myer, Jr. et al. ................. 364/200 |
| 5,247,672 | 9/1993 | Mohan ........................... 395/650 |
| 5,379,412 | 1/1995 | Eastridge et al. ................ 395/575 |
| 5,414,839 | 5/1995 | Joshi ............................. 395/600 |
| 5,452,430 | 9/1995 | Dievendorff et al. ........... 395/183.13 |
| 5,455,944 | 10/1995 | Haderle et al. .................. 395/600 |
| 5,455,946 | 10/1995 | Mohan et al. ................... 395/600 |
| 5,459,862 | 10/1995 | Garliepp et al. ................. 395/600 |
| 5,495,601 | 2/1996 | Narang et al. ................... 395/600 |

*Primary Examiner*—Thomas G. Black
*Assistant Examiner*—Cheryl R. Lewis
*Attorney, Agent, or Firm*—Townsend and Townsend and Krueger LLP

[57] ABSTRACT

A method and system for maintaining database integrity utilizes a LOG file organized into slots with the number of slots never exceeding the largest number of concurrent transactions updating the database.

4 Claims, 5 Drawing Sheets